June 21, 1955 — M. SUSSMAN — 2,711,471
BANANA RIPENING APPARATUS
Filed Feb. 7, 1952 — 2 Sheets-Sheet 1
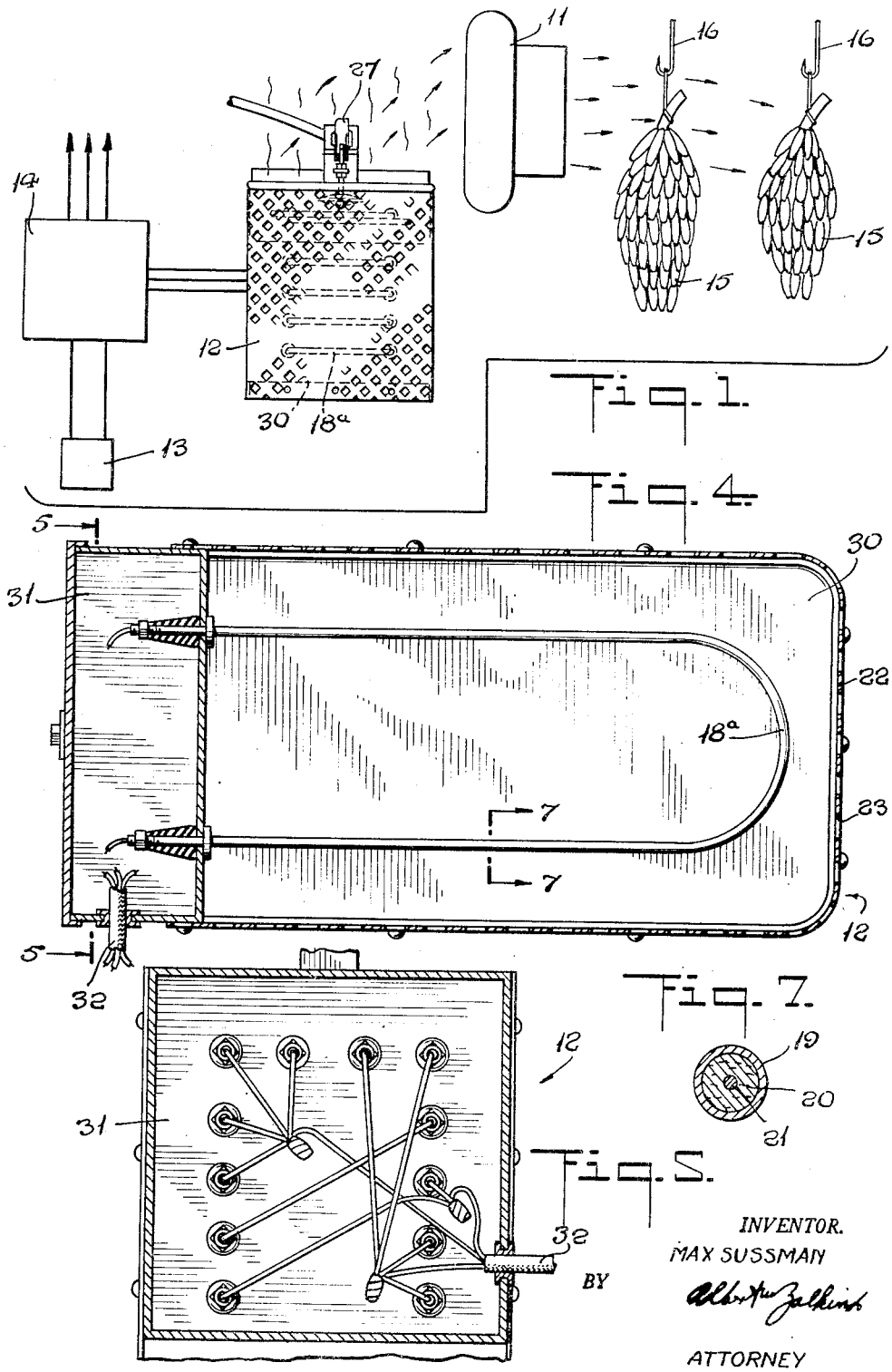

June 21, 1955     M. SUSSMAN     2,711,471
BANANA RIPENING APPARATUS
Filed Feb. 7, 1952     2 Sheets-Sheet 2
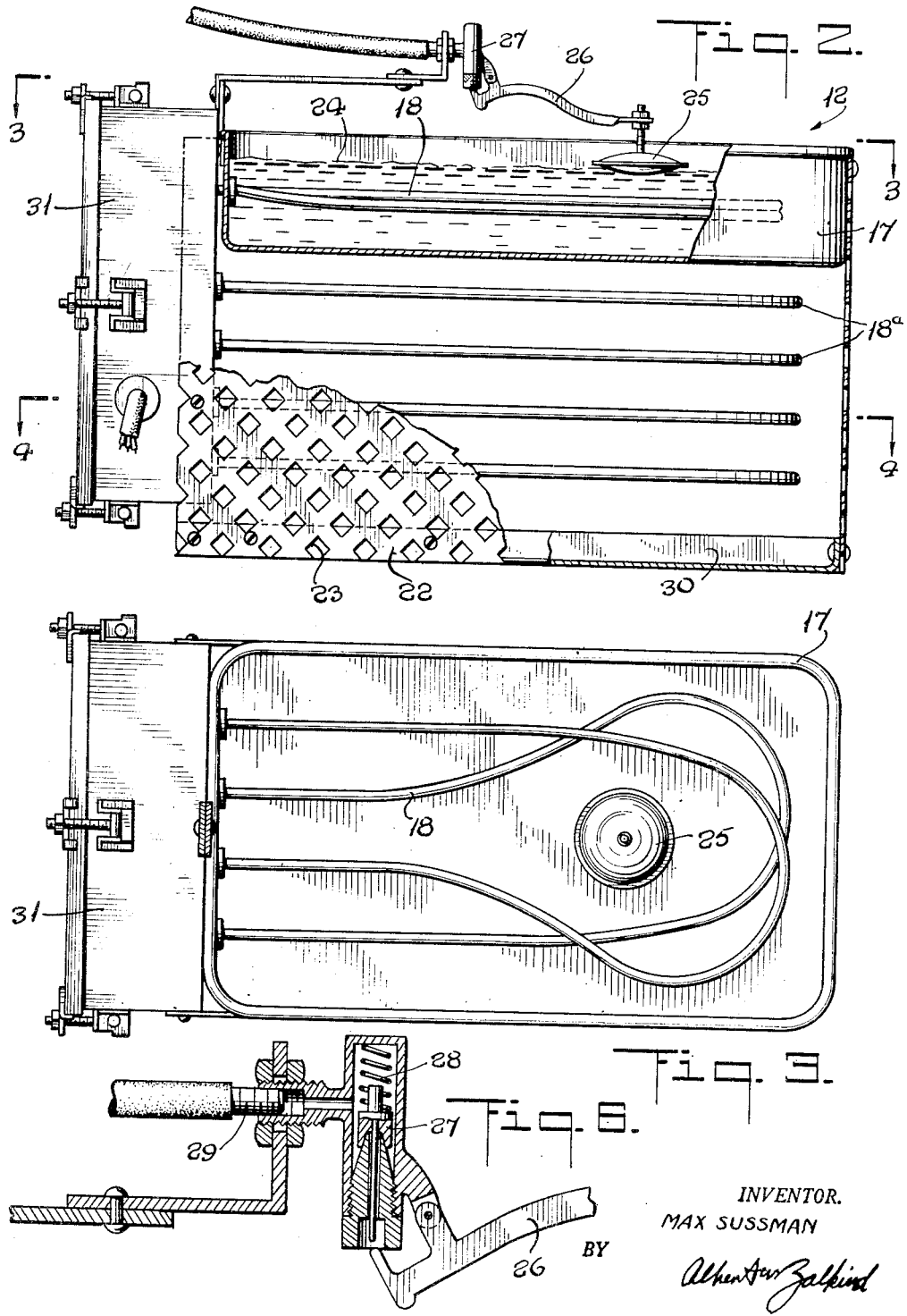
INVENTOR.
MAX SUSSMAN
BY
ATTORNEY

United States Patent Office 2,711,471
Patented June 21, 1955

2,711,471

BANANA RIPENING APPARATUS

Max Sussman, Brooklyn, N. Y.

Application February 7, 1952, Serial No. 270,320

4 Claims. (Cl. 219—38)

This invention relates to a banana ripening process and to the apparatus for performing the same.

It is well known in this art that due to the distance from which bananas must be brought to the point of ultimate consumption tree ripening is impractical. It was also discovered early that proper artificial ripening of the fruit must, for best results, be carried out in an environment as close to that in which the fruit grows as possible, and therefore must be carried out under conditions of relatively high temperature (70–100 degrees Fahrenheit) and as high humidity as possible. Various apparatus was devised to produce the desired conditions artificially but up until the time of this invention none of them have been satisfactory.

The first attempts to produce the desired conditions were carried out by merely placing the unripe bananas in an enclosed room and applying heat. This, however, since the proper humidity was not supplied, resulted in a drying of the fruit, and also, since air circulating means were not provided, resulted in uneven temperatures in various parts of the room producing uneven ripening. The later addition of air circulating means, while preventing uneven ripening, did not prevent the drying out of the fruit.

Attempts were made to supply the required humidity by the use of sprays of cold water upon the bananas to be ripened. While this expedient prevented drying of the fruit by providing a moist atmosphere the heat of vaporization of the water was removed from the point of the fruit at which the droplet of water came into contact and thus produced uneven ripening.

It was then attempted to spray the necessary water directly into the room in which the fruit was ripening away from the fruit. This expedient again produced cooling by reason of the absorption by the water of its heat of vaporization. Furthermore since the temperature control was difficult it was necessary for a banana dealer to constantly watch the temperature of the ripening room to prevent spoilage of the fruit.

Passing of steam directly into the ripening room was then attempted in order to produce the great humidity required and to prevent the cooling of the ripening room that took place when water was directly sprayed therein. However the high temperature of the steam would heat the ripening room and if the amount introduced was not carefully controlled would cook the ripening fruit.

The object of the present invention is to carry out a method of artificial ripening of bananas and to disclose an apparatus for carrying out the same, which will eliminate the difficulties inherent in the previous art.

Briefly stated the invention consists of an apparatus comprising a water chamber, heating means disposed within and without and preferably also below the water chamber, means for maintaining a constant water level within said water chamber, and temperature controlling means actuating said heating means in order to produce a constant temperature in the room in which the fruit is ripening. Electrical heating means are used to carry out the invention since this type of heating device is more easily controlled by means of the temperature controlling means. Air circulating means may also be provided.

The invention will be further described by reference to the accompanying drawings which are made a part of this specification.

Fig. 1 is a schematic view of the method of using the improved banana ripening apparatus of this invention.

Fig. 2 is a side view of the heating and humidifying unit of this invention with some of the parts broken away to show the internal construction.

Fig. 3 is a top view of the heating and humidifying unit of this invention, taken on line 3—3 of Fig. 2.

Fig. 4 is a sectional view of the heating and humidifying unit of this invention taken on line 4—4 of Fig. 2.

Fig. 5 is a sectional view of the heating and humidifying unit of this invention showing the wiring taken on line 5—5 of Fig. 4.

Fig. 6 is a detail view, partly in section, showing the means for maintaining a constant level of water in the water chamber of the heating and humidifying unit of this invention.

Fig. 7 is a detail view showing the electrical heating means used in the heating and humidifying unit of this invention taken on lines 7—7 of Fig. 4.

Referring to Fig. 1 there are provided air circulating means 11 and heating and humidifying means 12. Air circulating means 11 are preferably a simple conventional blower mechanism. Heating and humidifying means 12 are controlled by thermostat 13 which is connected to starting box 14.

Bananas 15 are suspended from hooks 16 at a distance from air circulating unit 11 and heating and humidifying unit 12.

Referring now to Figs. 2–7 for details for the heating and humidifying unit there are provided water chamber 17 which is kept full of water. Heating means 18 are immersed in the water. In addition, in order to produce the desired relatively high temperature atmosphere for the practice of this invention, additional heating means 18a are provided outside of and below water chamber 17. These heating means are electrical and are composed of electrical resistance element 21 surrounded by insulating material 20 and encased in shield member 19.

The temperature produced by heating means 18 and 18a is controlled by temperature controlling means 13 which preferably consist of a thermostat of the conventional compound bar type. The temperature should range from 70° to 100° F. and the relative humidity should be as close to 100% as possible. In the preferred modification of this invention, also, although not essential to its practice, drip pan 30 is provided to hold any water precipitated by condensation. Also, in order to provide protection for the operator of the apparatus, shield member 22 provided with perforations 23 may be embodied in the apparatus.

Starting box 31, of conventional construction for units of the type described, is used to provide for the electrical connections of the apparatus. Lead wire 32 connects all of the contact points of the apparatus to provide a continuous circuit.

The level of the water 24 in water chamber 17 is kept constant in the preferred modification of this invention by the use of float 25 which lies on the surface of the water 24 in water chamber 17. Float 25 is secured to arm 26 which in turn actuates closure means 27. Normally closure means 27 are kept in closed position by spring 28. Pipe 29 carries water under pressure which water, however, is prevented from entering water chamber 17 by closure means 27. However if float 25 drops because of a lowering of the level of water 24 because of its partial evaporation arm 26 which is capable of raising closure means 27 will force the same up against the pressure of spring 28 allowing water to flow into water chamber 17 until the level thereof is again restored.

It can therefore be easily seen that the device embodies all of the necessary structure to produce a constant humidity since it is designed for high humidity operation. The device will necessarily produce the temperature that the thermostatic control is set for, and, due to the fact that some of the heating coils are constantly immersed in water a high humidity is produced. It is therefore possible to produce ideal conditions for the ripening of bananas without the disadvantages of former processes.

It is also pointed out that the process and apparatus described herein, which finding its principal use in the ripening of bananas, may also be applied to the ripening of other tropical fruits where similar conditions are to be produced. It is clear, however, that when this apparatus is used to ripen tropical fruits other than bananas the temperatures set will be determined by the particular fruit to be ripened.

The foregoing specific embodiments of this invention are for illustrative purposes and for purposes of example only. Various changes and modifications can obviously be made within the spirit and scope of the invention and may occur to those skilled in this art.

I claim:

1. A device for the artificial ripening of fruit comprising a water chamber, an electrical heating element disposed within said water chamber, a plurality of electrical heating elements spaced from each other disposed below said water chamber, a drip pan below said heating elements, a perforated shield member disposed about said water chamber, electrical heating elements, and drip pan, means for maintaining a constant level of water within said water chamber, and temperature controlling means actuating all of said heating elements simultaneously so that the temperature is maintained at a predetermined level and the relative humidity is maintained as close to 100% as possible.

2. A device as described in claim 1 including air circulating means.

3. A device for the artificial ripening of fruit comprising a water chamber, an electrical heating element disposed within said water chamber, an additional plurality of electrical heating elements spaced from each other disposed below said water chamber, a drip pan below said heating elements, a perforated shield member disposed about said water chamber, electrical heating elements, and drip pan, means for maintaining a constant level of water within said water chamber said means comprising a pipe member leading into said water chamber and connected to a source of water supply, closure means at the end of said pipe member leading into said water chamber, an arm actuating said closure means, and a float lying on the surface of the water in said water chamber secured to said actuating arm; and temperature controlling means actuating all of said heating elements simultaneously so that the temperature is maintained at a predetermined level and the relative humidity is maintained as close to 100% as possible.

4. A device as described in claim 3 including air circulating means.

References Cited in the file of this patent

UNITED STATES PATENTS

| | | |
|---|---|---|
| 1,578,218 | Thompson | Mar. 23, 1926 |
| 1,825,385 | Day | Sept. 29, 1931 |
| 2,095,455 | Simonson | Oct. 17, 1937 |
| 2,175,758 | Neubert | Oct. 10, 1939 |
| 2,201,389 | De Give | May 21, 1940 |
| 2,223,429 | Smith et al. | Dec. 3, 1940 |